US012643172B2

(12) United States Patent
Kang et al.

(10) Patent No.:  US 12,643,172 B2
(45) Date of Patent:  Jun. 2, 2026

(54) RETAINER RING FOR WELDING WIRE

(71) Applicant: KISWEL LTD., Busan (KR)

(72) Inventors: Ho Kyu Kang, Changwon-si (KR);
Seong Hun Kim, Changwon-si (KR);
Chang Uk Song, Changwon-si (KR);
Kyo Hun Kim, Changwon-si (KR);
Hwi Chul Park, Changwon-si (KR)

(73) Assignee: KISWEL LTD., Busan (KR)

( * ) Notice: Subject to any disclaimer, the term of this
patent is extended or adjusted under 35
U.S.C. 154(b) by 317 days.

(21) Appl. No.: 18/040,072

(22) PCT Filed: May 28, 2021

(86) PCT No.: PCT/KR2021/006655
§ 371 (c)(1),
(2) Date: Jan. 31, 2023

(87) PCT Pub. No.: WO2022/039353
PCT Pub. Date: Feb. 24, 2022

(65) Prior Publication Data
US 2023/0271267 A1      Aug. 31, 2023

(30) Foreign Application Priority Data

Aug. 20, 2020      (KR) ........................ 10-2020-0104330

(51) Int. Cl.
B23K 9/133         (2006.01)
B65D 25/10         (2006.01)
(52) U.S. Cl.
CPC .......... B23K 9/1333 (2013.01); B65D 25/101
(2013.01)

(58) Field of Classification Search
CPC .... B23K 9/1333; B23K 9/133; B65D 25/101;
B65H 49/08; B65H 57/18; B65H 2701/36
See application file for complete search history.

(56) References Cited

U.S. PATENT DOCUMENTS 4,869,367 A       9/1989  Kawasaki et al.
8,882,018 B2 *  11/2014  Gelmetti ................ B65H 57/18
                                                        242/423.1

(Continued)

FOREIGN PATENT DOCUMENTS

JP         57-166269 A      10/1982
JP         62-100963 U       6/1987

(Continued)

OTHER PUBLICATIONS

Communication dated Jul. 2, 2024, issued in Japanese Application
No. 2023-506207.

(Continued)

*Primary Examiner* — Anna M Momper
*Assistant Examiner* — Tiffany Domonique Jefferson
(74) *Attorney, Agent, or Firm* — Sughrue Mion, PLLC

(57)                    ABSTRACT

Provided is a retainer ring for welding wire, the retainer ring
including a pressure plate which is disposed on a welding
wire stack wound and stored in a receiving container so as
to press the welding wire stack, and has an opening formed
at the center thereof; and a plurality of guide wings which
are provided at the outer circumference of the pressure plate
to come into contact with the inner wall of the receiving
container and each comprise a flexible body that can be
changed in shape.

8 Claims, 7 Drawing Sheets

(56) References Cited

U.S. PATENT DOCUMENTS

| | | | | |
|---|---|---|---|---|
| 8,967,520 | B2 * | 3/2015 | Matthews, III | B65H 49/12 |
| | | | | 242/423.1 |
| 8,985,495 | B2 * | 3/2015 | Bae | B65H 57/18 |
| | | | | 242/423.1 |
| 11,177,637 | B1 * | 11/2021 | Jordan | H02G 1/081 |
| 2007/0295853 | A1 * | 12/2007 | Cipriani | B65H 57/18 |
| | | | | 242/423 |
| 2009/0014572 | A1 * | 1/2009 | Weissbrod | B23K 9/1333 |
| | | | | 242/128 |
| 2013/0193259 | A1 * | 8/2013 | Weissbrod | B23K 9/1333 |
| | | | | 242/615 |
| 2014/0361115 | A1 * | 12/2014 | Gelmetti | B65H 57/18 |
| | | | | 242/593 |
| 2015/0225202 | A1 | 8/2015 | Cooper | |
| 2020/0385232 | A1 * | 12/2020 | González | B65H 57/06 |

FOREIGN PATENT DOCUMENTS

| | | | | |
|---|---|---|---|---|
| JP | 63-298121 | A | 12/1988 | |
| JP | 7-9564 | U | 2/1995 | |
| JP | 8-1282 | U | 8/1996 | |
| JP | 9-156827 | A | 6/1997 | |
| JP | 2004-337957 | A | 12/2004 | |
| JP | 2005-053649 | A | 3/2005 | |
| JP | 2005-169449 | A | 6/2005 | |
| JP | 3163003 | U | 9/2010 | |
| JP | 2012-16746 | A | 1/2012 | |
| JP | 2020-85089 | A | 6/2020 | |
| KR | 10-1987-0001076 | B1 | 6/1987 | |
| KR | 10-2001-0103852 | A | 11/2001 | |
| KR | 100350955 | B1 * | 8/2002 | |
| KR | 10-1067693 | B1 | 9/2011 | |
| KR | 10-1275114 | B1 | 6/2013 | |
| KR | 101275113 | B1 * | 6/2013 | B65H 59/06 |

OTHER PUBLICATIONS

Japanese Office Action issued Feb. 20, 2024 in Application No. 2023-506207.

Extended European Search Report issued Jan. 8, 2024 in Application No. 21858441.5.

International Search Report of PCT/KR2021/006655 dated Aug. 30, 2021 [PCT/ISA/210].

* cited by examiner

FIG. 4

RETAINER RING FOR WELDING WIRE

FIELD OF THE INVENTION

The present invention relates to a retainer ring for a welding wire, and more specifically, to a retainer ring for a welding wire capable of preventing twisting or tangling of a wire during wire withdrawal by securing uniform withdrawal quality regardless of a tensile strength or elasticity of the welding wire wound in a storage container for a welding wire.

DESCRIPTION OF RELATED ART

Welding wires are metal wires used for welding, and such welding wires are used for automatic and semi-automatic welding.

Methods of storing such a welding wire include a method of storing a welding wire after winding the welding wire around a reel-type spool or a method of storing a welding wire in a large storage container for a welding wire after the welding wire is wound in a coiled shape.

In this case, in a case in which a welding wire is stored in a storage container for a welding wire, a larger amount of welding wires can be stored as compared to a case in which a welding wire is stored on a spool. Accordingly, shipyards or other companies in which automated welding facilities are built use welding wires stored in storage containers for a welding wire.

Such a storage container for a welding wire includes a case body, a cover, and a sealing part. In this case, a hollow is formed in the case body, and the welding wire may be stored in the case body in a coiled shape.

The retainer ring for a welding wire according to the conventional technique is coupled to a guide band of a storage container for a welding wire and used. In addition, a welding wire wound in a case body is withdrawn through a hole formed in a middle of the retainer ring and used after connected to an external wire withdrawal device through a hole in a separate head cap member connected to the case body.

In this case, there is a problem that the wire gets twisted or tangled during withdrawal due to differences in tensile strength and elasticity according to metallic properties of the welding wire stored in the storage container for a welding wire.

(Patent Document 1) Korean Registered Patent Publication No. 10-1275114 (Jun. 10, 2013)

The present invention is intended to address the above-described problems of the conventional technique and directed to providing a retainer ring for a welding wire capable of preventing twisting or tangling of a wire during wire withdrawal by securing uniform withdrawal quality regardless of a tensile strength or elasticity of the welding wire wound in a storage container for a welding wire.

BRIEF SUMMARY OF THE INVENTION

In order to achieve the above purpose, one aspect of the present invention provides a retainer ring for a welding wire, the retainer ring including a pressure plate which is disposed on a welding wire stack wound in a storage container, presses the stack, and has a central portion in which an opening is formed and a plurality of guide wings provided on an outer circumferential portion of the pressure plate to be in contact with an inner wall of the storage container and formed of a flexible material of which a shape is deformable.

A width (L1) of the pressure plate may be greater than a width (L2) of the welding wire stack wound in the storage container.

A plurality of insertion parts may be formed on the outer circumferential portion of the pressure plate, and the guide wings may be insertion-coupled to the insertion parts.

Each of the insertion parts may include a base part on which at least one protrusion is formed and a cover part forming an insertion space with the base part, and each of the guide wings may include a coupling part in which at least one through hole coupled to the protrusion is formed and which is positioned in the insertion part and a protruding part which protrudes outward from the insertion part and is in contact with the inner wall of the storage container.

A thickness of the coupling part may be greater than a thickness of the protruding part.

The pressure plate may further include seating parts on which fixing rods for preventing the wound wire from being released while the storage contained is moved are fixedly seated and which are positioned to face each other with respect to the opening.

The pressure plate may further include at least one residual amount check part for checking a residual amount of the welding wire in the storage container.

The pressure plate may be formed of a ductile plate-shaped material.

The guide wing may be provided as eight guide wings formed at equal intervals on the outer circumferential portion of the pressure plate.

One end portion of the protruding part may be in contact with the inner wall of the storage container, and the other end portion of the protruding part and the inner wall of the storage container may form a space portion.

According to one aspect of the present invention, since a pressure plate is formed to have a thickness so that the pressure plate has ductility, deformation of a wire stack is minimized when a wire is withdrawn, and a problem that the welding wire is tangled due to movement of the pressure plate caused by resistance of the withdrawal wire can be prevented.

In addition, since a plurality of guide wings are provided on an outer circumferential portion of a pressure plate at equal intervals, the pressure plate can be positioned in a balanced manner in a central portion of a storage container without being biased to one side, and a wire can be withdrawn uniformly during wire withdrawal.

In addition, twisting or tangling of a wire can be prevented during wire withdrawal by securing uniform withdrawal quality regardless of a tensile strength or elasticity of the welding wire wound in a storage container for a welding wire.

Effects of the present invention are not limited to the above-described effects, and it should be understood that the effects of the present invention include any effect which may be inferred from the configuration of the invention described in the detailed description and the claims of the present invention.

BRIEF DESCRIPTION OF THE SEVERAL VIEWS OF THE DRAWINGS

FIG. 4 is a perspective view illustrating the retainer ring for a welding wire from below according to one embodiment of the present invention from below.

DETAILED DESCRIPTION OF THE INVENTION

Figure 1:
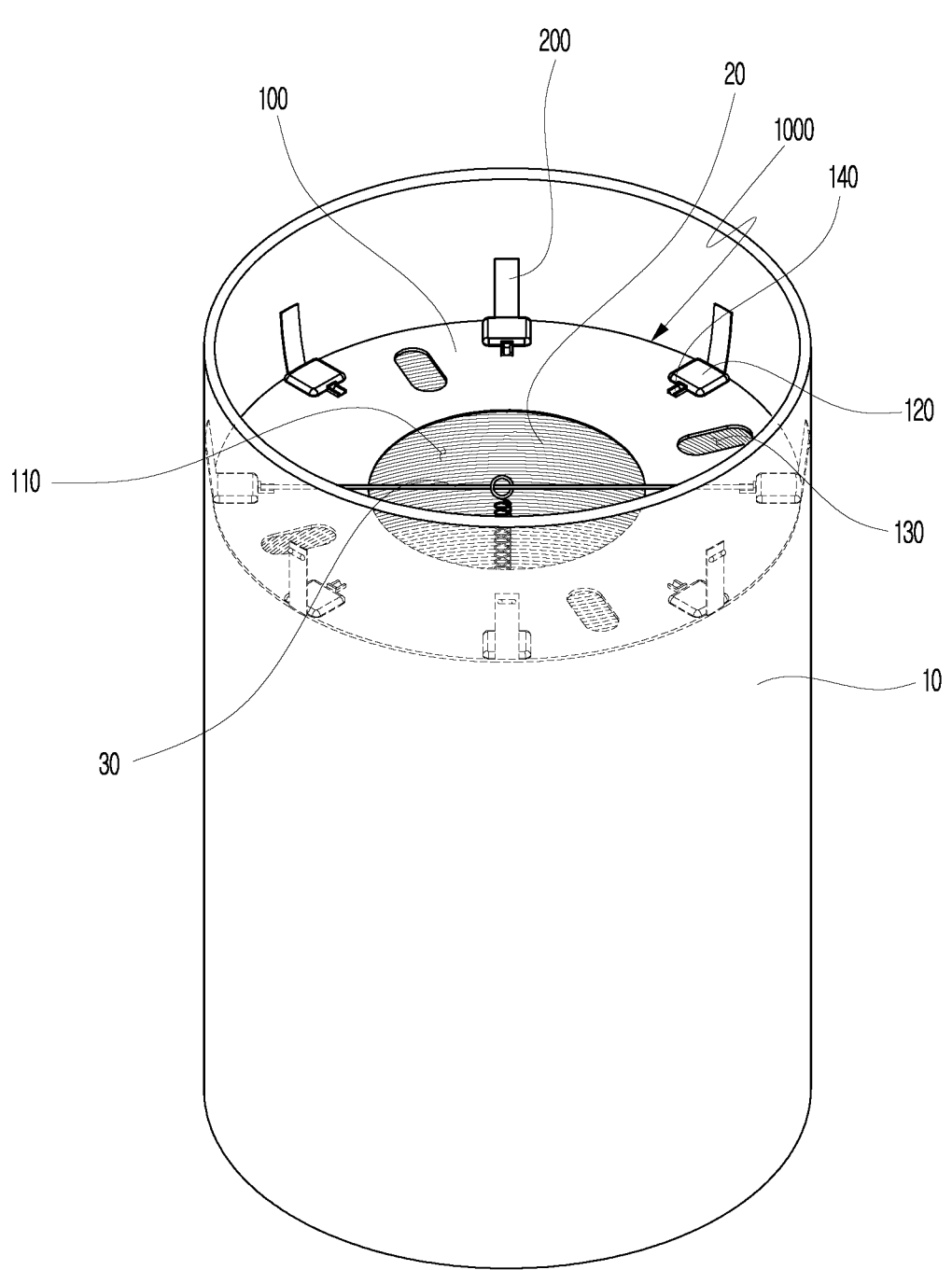
FIG. 1 is a perspective view illustrating a storage container to which a retainer ring for a welding wire is applied according to one embodiment of the present invention.

Hereinafter, the present invention will be described in detail with reference to the accompanying drawings. However, embodiments of the present invention may be implemented in several different forms and are not limited to embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, it includes being "directly connected" and "indirectly connected" via an intervening part. Also, when a certain part "includes" a certain component, this does not exclude other components unless explicitly described otherwise, and other components may be further included.

Hereinafter, embodiments of the present invention will be described in detail with reference to the accompanying drawings.

Figure 2:
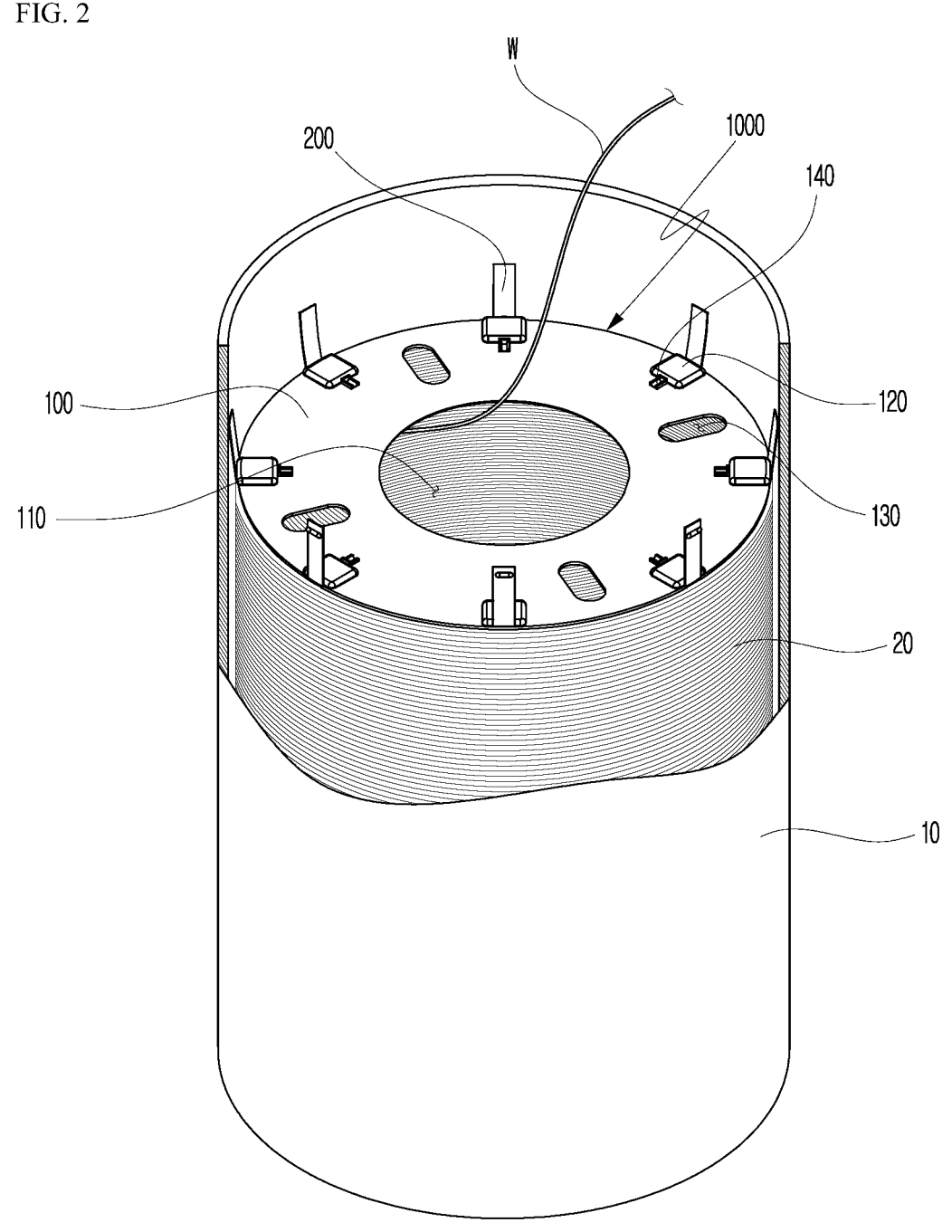
FIG. 2 is a partial cutaway perspective view illustrating the storage container to which the retainer ring for a welding wire is applied according to one embodiment of the present invention.
Figure 3:
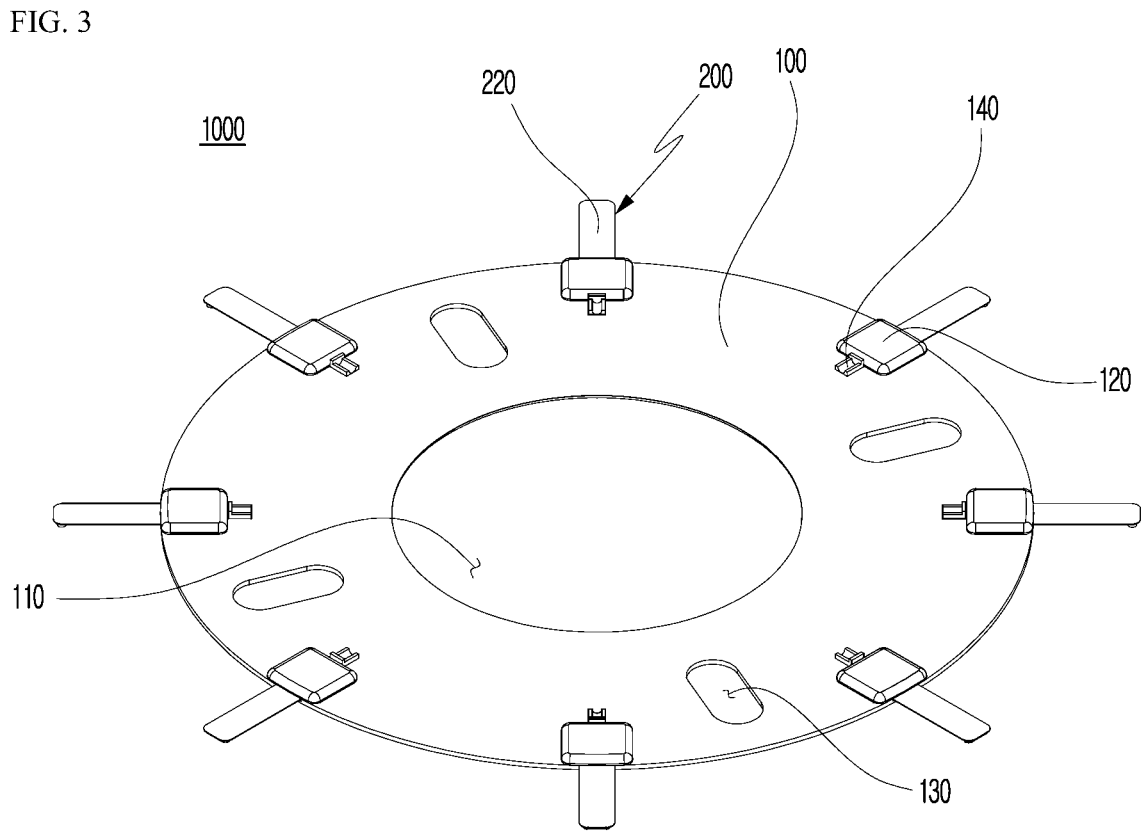
FIG. 3 is a perspective view illustrating the retainer ring for a welding wire from above according to one embodiment of the present invention.
Figure 4:
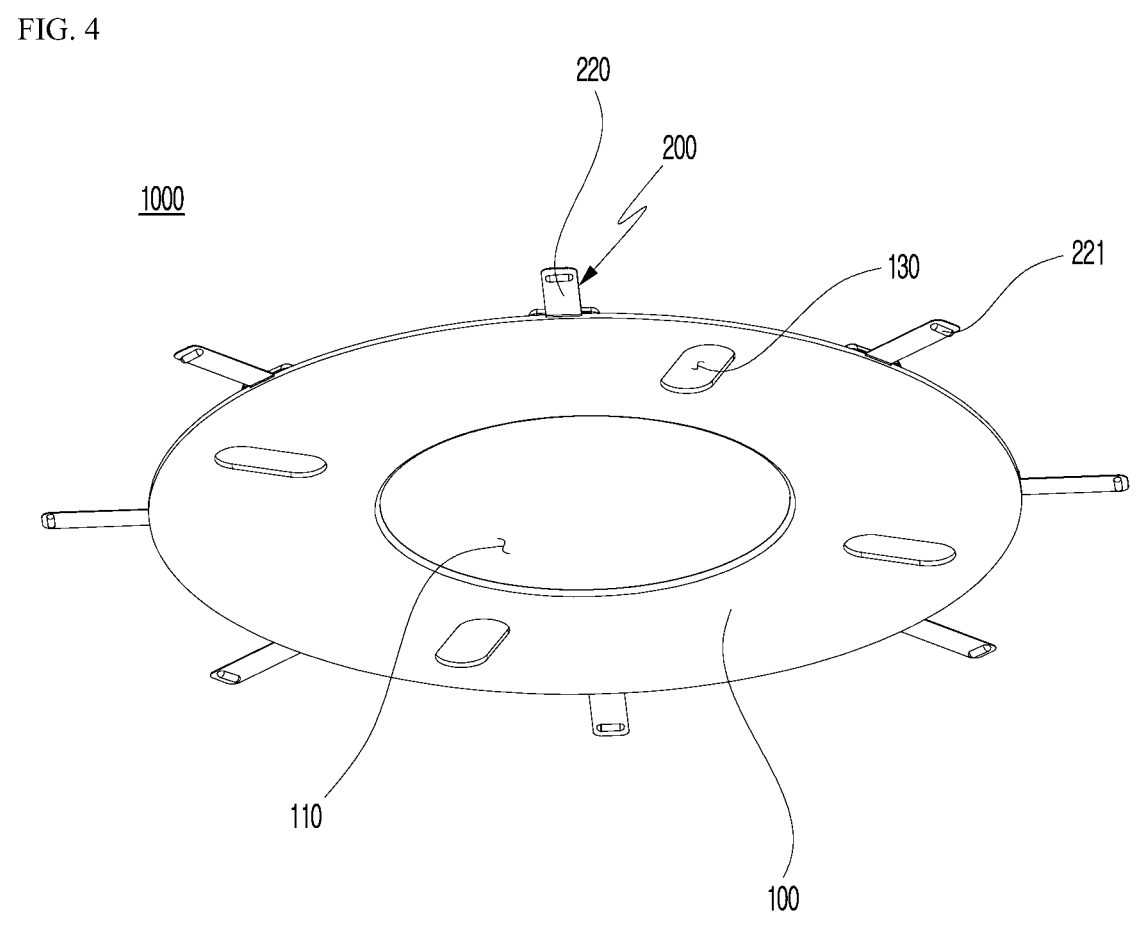

FIG. 1 is a perspective view illustrating a storage container to which a retainer ring for a welding wire is applied according to one embodiment of the present invention, and FIG. 2 is a partial cutaway perspective view illustrating the storage container to which the retainer ring for a welding wire is applied according to one embodiment of the present invention. FIG. 3 is a perspective view illustrating the retainer ring for a welding wire from above according to one embodiment of the present invention, and FIG. 4 is a perspective view illustrating the retainer ring for a welding wire from below according to one embodiment of the present invention from below.

Referring to FIGS. 1 to 4, a retainer ring 1000 for a welding wire is formed to include a pressure plate 100 and a plurality of guide wings 200.

More specifically, the retainer ring 1000 for a welding wire includes the pressure plate 100 which is positioned on a welding wire stack 20 wound in a storage container 10, presses the stack 20, and has a central portion, in which an opening 110 is formed, and the plurality of guide wings 200 which are provided on the outer circumferential portion of the pressure plate 100 to be in contact with an inner wall 11 of the pressure plate 100 and formed of a flexible material of which a shape is deformable.

The storage container 10 may be formed in a cylindrical shape, and the welding wire stack 20, in which a wire W is stacked in a coiled shape, may be accommodated in a space in the storage container 10.

That is, the retainer ring 1000 for a welding wire may be installed on the stack 20 in the storage container 10 in which the welding wire W stacked in a continuous loop shape is stored in the form of the welding wire stack 20.

The retainer ring 1000 for a welding wire is provided so that the wire W is prevented from being twisted or tangled by pressing the stack 20 from above when the wire W is withdrawn.

In this case, the welding wire W may be accommodated in any type of the storage container 10 such as a cylindrical, square, hexagonal, or octagonal box. Accordingly, the retainer ring 1000 for a welding wire of the present invention may also be formed to correspond to any type of the storage container 10.

The pressure plate 100 is formed so that an outer diameter is smaller than an inner diameter of an inner space of the storage container 10, and thus a gap is formed between the pressure plate 100 and an inner wall of the storage container 10. In addition, the opening 110 is formed in the central portion of the pressure plate 100 to correspond to a hollow formed in a central portion of the wire stack 20. In this case, the welding wire W may be withdrawn to the outside through the opening 110.

According to one embodiment, the pressure plate 100 is characterized by having a width L1 greater than a width L2 of the welding wire stack 20 wound in the storage container 10. That is, since a diameter of the central opening 110 of the pressure plate 100 is smaller than a diameter of the hollow in the welding wire stack 20, the pressure plate 100 may press the entire stack 20. Accordingly, when the wound wire W is withdrawn, the wound wire W can be more easily withdrawn from the storage container 10 one strand by one strand.

In addition, the pressure plate 100 is characterized by being formed of a ductile plate-shaped material. That is, the pressure plate 100 has a thickness so that the pressure plate has ductility and smoothly moves downward while immediately filling a space between the stack 20 and the pressure plate 100 formed when the wire W is withdrawn.

Accordingly, the pressure plate 100 can minimize deformation of the wire stack 20 when the wire W is withdrawn. In addition, a problem that the welding wire W is tangled due to a weight of the retainer ring 1000 for a welding wire and movement of the pressure plate 100 caused by resistance of the withdrawing wire can be solved.

Meanwhile, the pressure plate 100 may further include seating parts 140 on which fixing rods 30 for preventing unwinding of the wound wire W when the storage container 10 is moved are fixedly seated and which are formed at positions facing each other with respect to the opening 110.

The fixing rods 30 may be mounted on the retainer ring 1000 for a welding wire so that the wound wire W is firmly fixed when the storage container 10 is packaged in a state in which the retainer ring 1000 for a welding wire is accommodated in the storage container 10, or when the wound wire W is partially used and stored.

That is, the fixing rods 30 may be formed of a heavy metal material and may be removed from the retainer ring 1000 for a welding wire when the wire W is used. In this case, one end portion and the other end portion of the fixing rod 30 may be inserted into and seated on the seating part 140 formed on the pressure plate 100, and thus, when the wire W is used, or when the wire W is used and stored, a speedy operation can be performed.

Meanwhile, the pressure plate 100 may further include at least one residual amount check part 130 for checking a residual amount of welding wire W in the storage container 10. In this case, the residual amount check part 130 may be formed lengthily in a width direction of the pressure plate 100. Accordingly, a user may easily check the residual amount of welding wire W in the storage container 10 through the residual amount check part 130.

Figure 5:
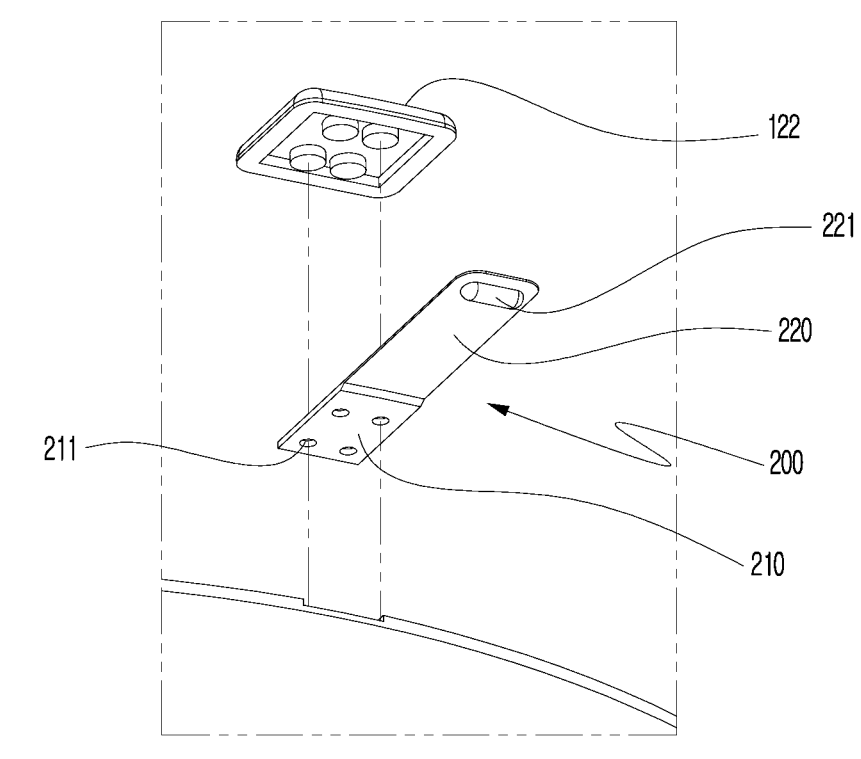
FIG. 5 is an exploded view illustrating a guide wing according to one embodiment of the present invention.
Figure 5:
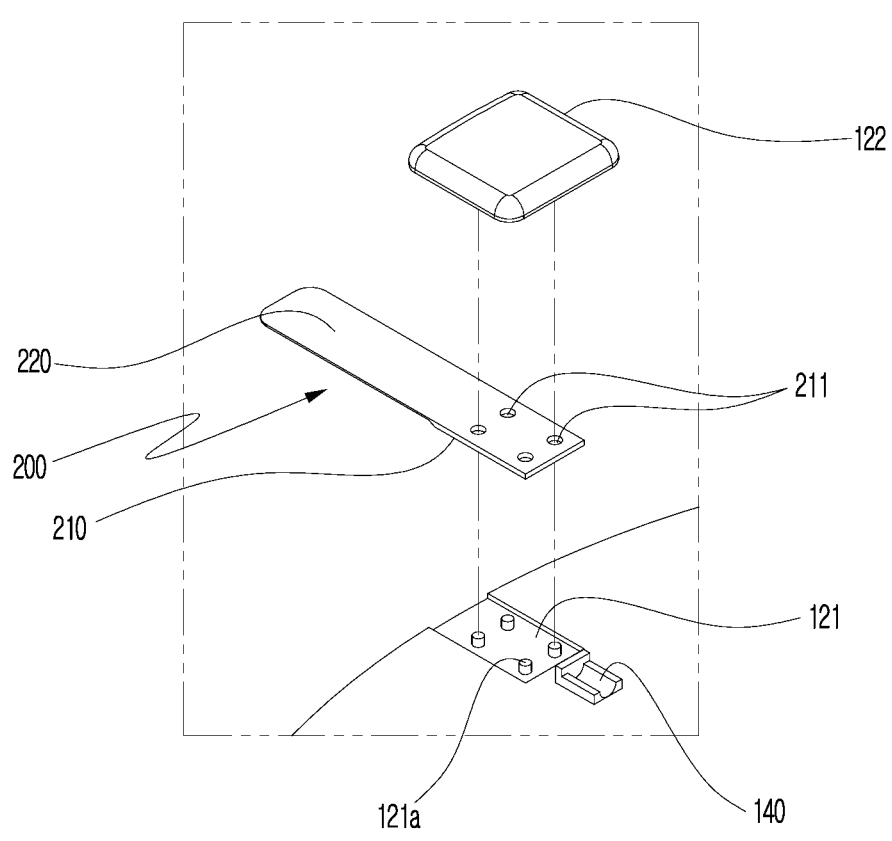
Figure 6:
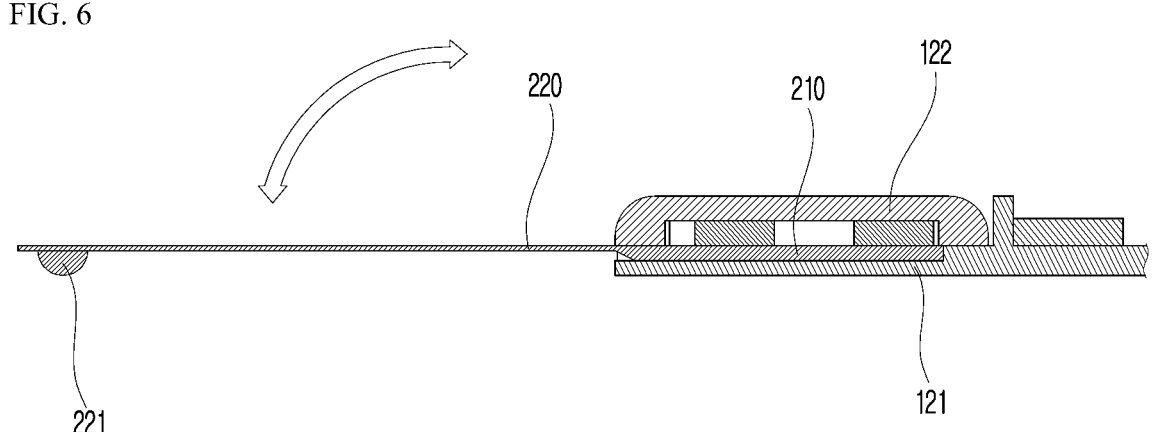
FIG. 6 is a cross-sectional view illustrating the guide wing according to one embodiment of the present invention.
Figure 7:
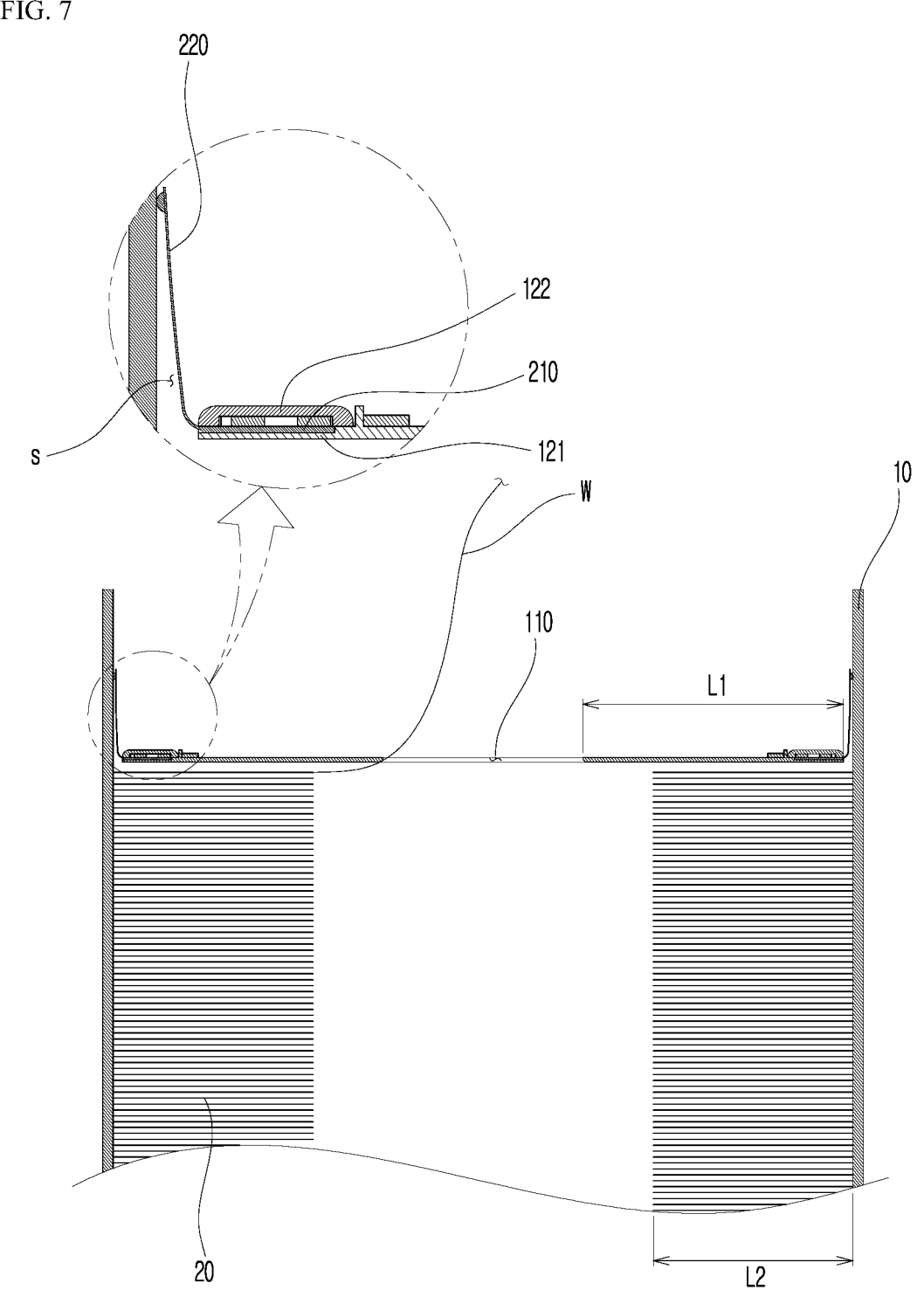
FIG. 7 is a cross-sectional view illustrating the storage container to which the retainer ring for a welding wire is applied according to one embodiment of the present invention.

FIG. 5 is an exploded view illustrating a guide wing according to one embodiment of the present invention, FIG. 6 is a cross-sectional view illustrating the guide wing according to one embodiment of the present invention, and FIG. 7 is a cross-sectional view illustrating the storage container to which the retainer ring for a welding wire is applied according to one embodiment of the present invention.

Referring to FIGS. 1 to 7, the retainer ring 1000 for a welding wire includes a guide wing 200 provided on the outer circumferential portion of the pressure plate 100 to be in contact with the inner wall of the storage container 10.

The guide wing 200 is formed of a flexible material which is deformable and formed to protrude to be in contact with the inner wall of the storage container 10. That is, the guide wing 200 is bent upward as one end portion is in contact with the inner wall of the storage container 10 and moved downward along the inner wall of the storage container 10 until the wound welding wire W is completely exhausted.

The guide wing 200 may be provided as a plurality of guide wings 200 on the outer circumferential portion of the pressure plate 100. Preferably, eight guide wings 200 may be provided at equal intervals on the outer circumferential portion the pressure plate 100.

That is, the guide wings 200 disposed at equal intervals may be elastically pressed toward a center of the retainer ring 1000 for a welding wire while in contact with the inner wall of the storage container 10, and the pressure plate 100 may be positioned in a balanced manner in a central portion in the storage container 10 without being biased to one side. Accordingly, a winding stress generated when the wire W is withdrawn may be uniformly dispersed to prevent the wire W from being tangled and twisted.

Meanwhile, a plurality of insertion parts 120 are formed in the outer circumferential portion of the pressure plate 100, and the guide wings 200 may be insertion-coupled to the insertion parts 120.

More specifically, each of the insertion parts 120 of the pressure plate 100 may include a base part 121 on which at least one protrusion 121a is formed and a cover part 122 forming an insertion space with the base part 121. In addition, the guide wing 200 may include a coupling part 210 in which at least one through hole 211 coupled to the protrusion 121a is formed and which is positioned in the insertion part 120 and a protruding part 220 which is formed to protrude outward from the insertion part 120 and is in contact with the inner wall of the storage container 10.

In addition, a protrusion part 221 may be further formed on a lower surface of the protruding part 220. The protrusion part 221 is elastically pressed while substantially in contact with the inner wall of the storage container 10 and reduces a contact area between the lower surface of the protruding part 220 and the inner wall of the storage container 10, and thus the retainer ring 1000 for a welding wire is more easily moved downward when the wire W is withdrawn.

That is, as a structure, in which the plurality of guide wings 200 are insertion-coupled to the outer circumferential portion of the pressure plate 100, is formed, the productivity of the retainer ring 1000 for a welding wire can be improved, and quality uniformity can be improved compared to a coupling structure using a method of using a tape, an adhesive, or thermal compression.

In this case, a thickness of the coupling part 210 of the guide wing 200 may be greater than a thickness of the protruding part 220. That is, the retainer ring 1000 for a welding wire can be positioned in the central portion of the storage container 10, and the wire W can be more uniformly withdrawn due to an improved effect of a tensile strength caused by a difference in thickness between the coupling part 210 inserted into the pressure plate 100 and the protruding part 220 exposed to the outside to be in contact with the inner wall of the storage container 10.

Meanwhile, one end portion of the protruding part 220 is in contact with the inner wall of the storage container 10, and the other end portion of the protruding part 220 and the inner wall of the storage container 10 may form a space portion S. When the wire W wound in the storage container 10 is withdrawn, a problem, that the wire W bounces upward along the inner wall of the storage container 10 or moves downward through the hollow of the wire stack 20 while a torsional stress received when a subsequent wire loop is wound is released, may occur. In this case, as the space portion S is formed between the other end portion of the protruding part 220 and the inner wall of the storage container 10, the torsional stress of the wire W which occurred during winding may be released, and thus tangling and twisting of the wire W can be prevented.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be implemented in a distributed manner, and similarly, components that are described as being distributed may be implemented in a coupled manner.

The scope of the present invention is defined by the appended claims and encompasses all modifications or alterations derived from meanings, the scope, and equivalents of the appended claims.

REFERENCE NUMERALS

1000: RETAINER RING FOR A WELDING WIRE
100: PRESSURE PLATE
110: OPENING
120: INSERTION PART
130: RESIDUAL AMOUNT CHECK PART
140: SEATING PART
200: GUIDE WING
210: COUPLING PART
220: PROTRUDING PART

The invention claimed is:
1. A retainer ring for a welding wire, comprising:
a pressure plate which is disposed on a welding wire stack wound in a storage container, presses the welding wire stack, and has a central portion in which an opening is formed; and
a plurality of guide wings provided on an outer circumferential portion of the pressure plate to be in contact with an inner wall of the storage container and formed of a flexible material of which a shape is deformable, wherein:

a plurality of insertion parts are formed on the outer circumferential portion of the pressure plate; and the guide wings are insertion-coupled to the insertion parts, wherein:

each of the insertion parts includes a recessed base part on which at least one protrusion is formed and a cover part forming an insertion space with the base part; and each of the guide wings includes a coupling part in which at least one through hole coupled to the protrusion is formed and which is positioned in the insertion part and a protruding part which extends substantially horizontally outward from the insertion part and is in contact with the inner wall of the storage container, and wherein a protrusion part is formed on a distal end of a lower surface of the protruding part for reducing a contact area between the lower surface of the protruding part and the inner wall of the storage container.

2. The retainer ring of claim 1, wherein a width (L1) of the pressure plate is greater than a width (L2) of the welding wire stack wound in the storage container.

3. The retainer ring of claim 1, wherein a thickness of the coupling part is greater than a thickness of the protruding part.

4. The retainer ring of claim 1, wherein the pressure plate further includes seating parts on which fixing rods for preventing the welding wire stack-would wound in the storage container from being released while the storage container is moved are fixedly seated and which are positioned to face each other with respect to the opening.

5. The retainer ring of claim 1, wherein the pressure plate further includes at least one residual amount check part for checking a residual amount of the welding wire in the storage container.

6. The retainer ring of claim 1, wherein the pressure plate is formed of a ductile plate-shaped material.

7. The retainer ring of claim 1, wherein the guide wing is provided as eight guide wings formed at equal intervals on the outer circumferential portion of the pressure plate.

8. The retainer ring of claim 1, wherein:

a first end portion of the protruding part is in contact with the inner wall of the storage container; and a second end portion of the protruding part and the inner wall of the storage container form a space portion.

* * * * *